United States Patent
Nugraha et al.

(10) Patent No.: US 11,561,667 B2
(45) Date of Patent: Jan. 24, 2023

(54) SEMI-VIRTUALIZED PORTABLE COMMAND CENTER

(71) Applicant: International Business Machines Corporation, Armonk, NY (US)

(72) Inventors: Christian Nugraha, Singapore (SG); Weng Foong Khong, Singapore (SG); Muhammad Muneer Kader Shareiff, Singapore (SG); Yin Mon Zun, Singapore (SG); Melinda Quiambao Litonjua, Singapore (SG); Lay Him Yeo, Singapore (SG); Feng Xue, Singapore (SG); Ai Kiar Ang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 17/223,066

(22) Filed: Apr. 6, 2021

(65) Prior Publication Data
US 2022/0317823 A1    Oct. 6, 2022

(51) Int. Cl.
G06F 3/16       (2006.01)
G06F 3/0481     (2022.01)
G06F 3/01       (2006.01)
G06F 3/04845    (2022.01)

(52) U.S. Cl.
CPC ............ *G06F 3/0481* (2013.01); *G06F 3/017* (2013.01); *G06F 3/04845* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 6,134,105 A | 10/2000 | Lueker | |
| 8,175,895 B2 | 5/2012 | Rosenfeld et al. | |
| 10,270,556 B2 | 4/2019 | Ye et al. | |
| 2010/0085416 A1* | 4/2010 | Hegde | H04N 7/157 348/E7.083 |

(Continued)

FOREIGN PATENT DOCUMENTS

| | | |
|---|---|---|
| CN | 202143106 U | 12/2012 |
| CN | 103761844 A | 4/2014 |
| CN | 109466404 A | 3/2019 |

OTHER PUBLICATIONS

Ahsraf et al., "Stand up a 24/7 virtual command center rapidly", Accenture, Apr. 1, 2020, 6 pages.

(Continued)

*Primary Examiner* — Rinna Yi
(74) *Attorney, Agent, or Firm* — Cantor Colburn LLP; Jeffrey Ingalls

(57) ABSTRACT

Aspects of the invention include receiving, by a processor, operational data, determining a dashboard template including a set of windows arranged within the dashboard template, the dashboard template determined based at least in part on the operational data, determining a set of key performance indicators (KPIs), generating a command center dashboard having a layout including one or more windows from the set of windows, wherein each of the one or more windows displays an application associated with each KPI in the set of KPIs, and projecting, through a display device, the command center dashboard.

20 Claims, 7 Drawing Sheets

(56) References Cited

U.S. PATENT DOCUMENTS

| | | | | |
|---|---|---|---|---|
| 2012/0330728 A1* | 12/2012 | Enyeart | ............... | G06Q 10/00 |
| | | | | 705/7.39 |
| 2013/0222299 A1* | 8/2013 | Heo | ................. | G06F 16/4393 |
| | | | | 345/173 |
| 2014/0282053 A1* | 9/2014 | Hauschild | ............ | G06F 3/0481 |
| | | | | 715/744 |
| 2014/0304606 A1* | 10/2014 | Ohmura | ............... | G06F 3/167 |
| | | | | 715/728 |
| 2014/0358252 A1 | 12/2014 | Ellsworth et al. | | |
| 2016/0217406 A1* | 7/2016 | Najmi | ............. | G06Q 10/06315 |
| 2019/0012390 A1* | 1/2019 | Nishant | ............... | G06F 16/248 |
| 2020/0126309 A1* | 4/2020 | Moroze | ............... | G06F 16/904 |

OTHER PUBLICATIONS

Anonymous, "Virtualized Command Center", IP.com Prior Art Database Technical Disclosure, IPCOM000109087D, Mar. 23, 2005, 4 pages.

Crescendo, "Rapidly Deployable Communications Command Center", L3Harris Technologies, Oct. 27, 2020, 4 pages.

Everbridge, "Visual Command Center", URL: https://www.everbridge.com/products/visual-command-center/, Received: Feb. 25, 2021, 5 pages.

IBM, "Putting cybercrime on the road to ruin", URL: https://ww.ibm.com/in-en-security/services/managed-security-services/xforce-command-cyber-tactical-operations-center, Received: Feb. 22, 2020, 7 pages.

Mistral Solutions, "Mobile C4ISR Platforms", Mobile Surveilance Vehicle, Mobile Command Center Vehicles, 2020, 7 pages.

Sussex et al., "How the virtual command center can support business continuity for FIs", Ernst & Young LLP, Jun. 19, 2020, 7 pages.

Wong, "During disaster relief, how to make the command center hear the incident reporter and see the emergency on-site conditions?", Linkedin, Oct. 23, 2019, 6 pages.

\* cited by examiner

US 11,561,667 B2

SEMI-VIRTUALIZED PORTABLE COMMAND CENTER

BACKGROUND

The present invention generally relates to a command center, and more specifically, to a semi-virtualized, portable command center.

A command center can include any location that is used for providing centralized command for a given purpose. A command center can enable real-time visibility and management of all aspects of an operation. An example is an air traffic control command center which allows air traffic controllers to view the status of critical processes on a single display. Command centers typically require dedicated hardware including a centralized command display screen and computing devices multiplexed to display on the centralized command display screen. These typical command centers require large facilities to house the dedicated hardware.

SUMMARY

Embodiments of the present invention are directed to methods for deploying a portable command center. A non-limiting example computer-implemented method includes receiving, by a processor, operational data, determining a dashboard template including a set of windows arranged within the dashboard template, the dashboard template determined based at least in part on the operational data, determining a set of key performance indicators (KPIs), generating a command center dashboard having a layout including one or more windows from the set of windows, wherein each of the one or more windows displays an application associated with each KPI in the set of KPIs, and projecting, through a display device, the command center dashboard.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
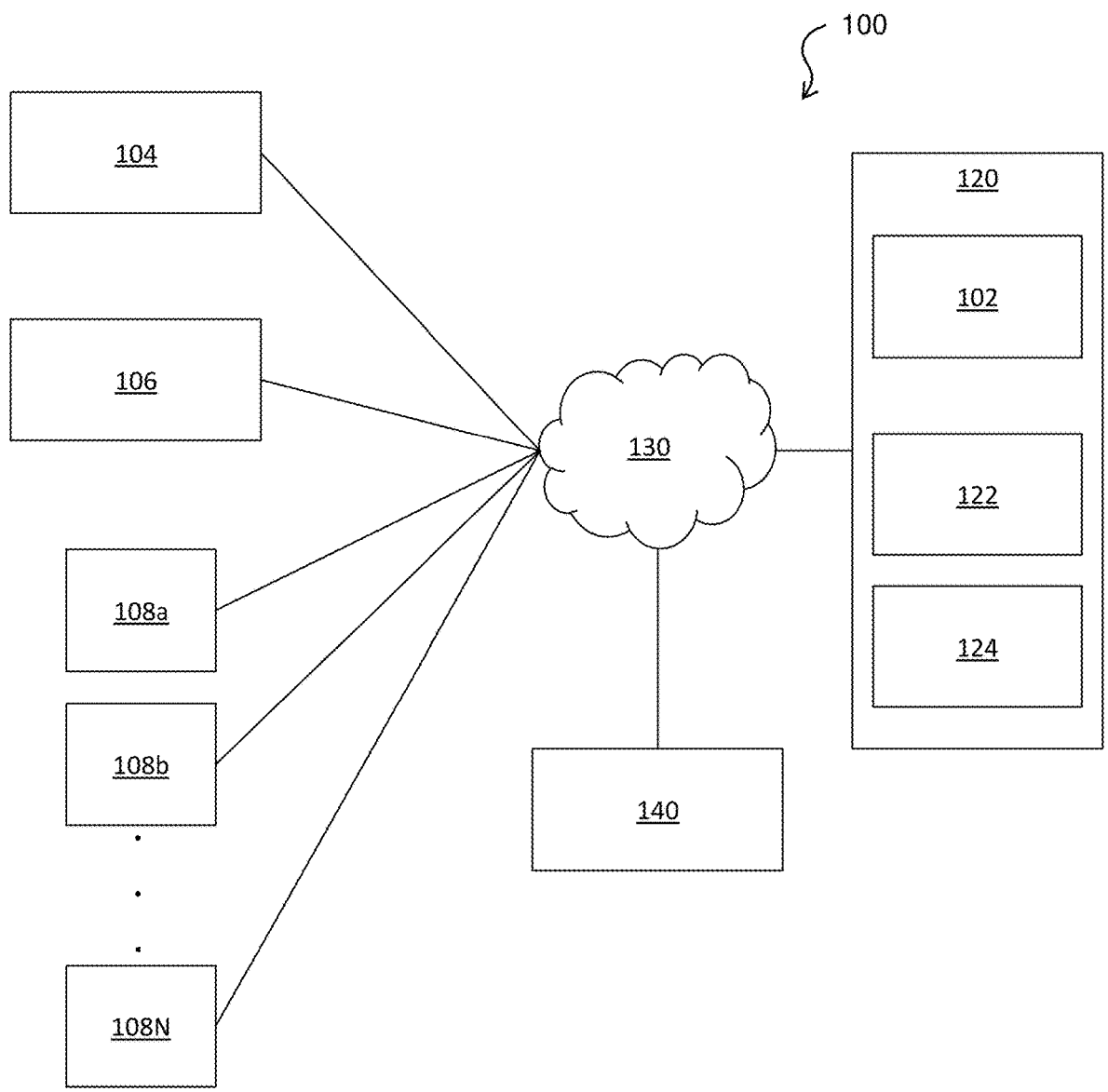
FIG. 1 depicts a block diagram of a system for a portable command center in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for a semi-virtualized, portable command center. Aspects of the invention replace the rigid, expensive hardware required for traditional command centers and provide a portable command center that is customizable for specific command and operational purposes. A command center dashboard is generated having a set of windows within the command center dashboard to display information and applications related to an operation or organization. The command center dashboard is portable because it can be displayed at any location using, for example, a portable projector display device. The hardware commonly found locally within a typical command center is virtualized and processed on an external server in communication with the display device.

Traditional command centers typically include large and fixed room facilities for housing the command center. Also, the typical command center includes multiple computing sources that are linked to a multiplexer for display on a fixed video wall in the command center. Each computing source includes a separate dashboard displayed on the computing source screen operated by an individual. These typical command centers have the disadvantage of high costs for setup and maintenance. These command centers also require large spaces with rigid and inflexible display templates and are time consuming for integrating or updating new applications.

Embodiments of the invention remove the dependency and constraints of hardware required in typical command centers by providing a semi-virtualized and portable command center. This allows for a command center to be set up on demand or in any emergency situation in any suitable location. For example, a display device, such as a portable projector, can project a command dashboard on a wall and the processing requirements can be performed on an outside server in communication with the portable projector. The command dashboard can include a set of customizable windows that can each display an associated graphic, video, and/or application based on inputs from a user, for example. These inputs can be a selection from a set of key performance indicators (KPIs) that are relevant to the purpose of the command center. KPIs are a type of performance measurement which evaluate the success of an organization or of a particular activity in which the organization engages. For example, in a supply chain operation, a KPI can include orders associated with the supply chain. The orders can be broken down by type, status, and the like and graphics associated with these orders can be displayed in various windows in a command center dashboard. For example, a graph showing the percentage of orders that are on-time versus late orders can be displayed within a window of the command center dashboard.

Turning now to FIG. 1, a block diagram of a system 100 for a portable command center is generally shown in accordance with one or more embodiments of the present invention. The system 100 includes a controller 102 associated with a server 120. The server 120 also includes a dashboard template database 122 and a KPI database 124 being accessible by the controller 102. The controller 102 can also access an external database 140 through a network 130. The controller 102 is configured to provide a customizable command center dashboard that is deployable via a display device. The system 100 includes the display device 104 which can be any type of display device including, but not limited to, a portable projector, a fixed projector, a television screen, a computer monitor, a phone screen, and the like. The display device 104 can communicate with the controller 102 through the network 130. In addition, the system 100 includes a sensor device 106 that can be separate from the display device 104 or housed within the display device 104. The sensor device 106 can include an audio sensor, video sensor, temperature sensor, biometric sensor, and/or any other type of sensor. In one or more embodiments of the invention, the system 100 includes one or more computing devices 108a-108N. The one or more computing devices 108a-108N can communicate with the controller 102, the display device 104, and the sensor device 106 through the network 130.

In one or more embodiments of the invention, the controller 102 provides a command center dashboard that can be displayed through the display device 104 to enable a portable command center for various applications. The one or more computing devices 108a-108N can be utilized to set up the command center dashboard through communication with the controller 102 on the server 120. The one or more computing devices 108a-108N can receive inputs from a user that enters operational data associated with an operation and/or event that requires the use of a command center. For example, a logistics company could be managing a global supply chain which would require a command center to view the status of the operation. A user can access a computer device 108 to enter operational data related to the global supply chain or access a database 140 associated with the supply chain to access the operational data. Operational data includes all information associated with the global supply chain including, without limitation, facility data, logistical data, orders data, financial data, real-time data and numbers associated with the operation, and the like. The operation data can be inputted by the user and/or accessed from a database, for example. In an effort to guide the user for developing a command center dashboard for display of the operation, the controller 102 can analyze the operation data associated with the supply chain and select, from the dashboard template database 122, a dashboard template having a set of windows that are configurable for displaying information and/or applications based on the user's input and/or the operational data.

Figure 2:
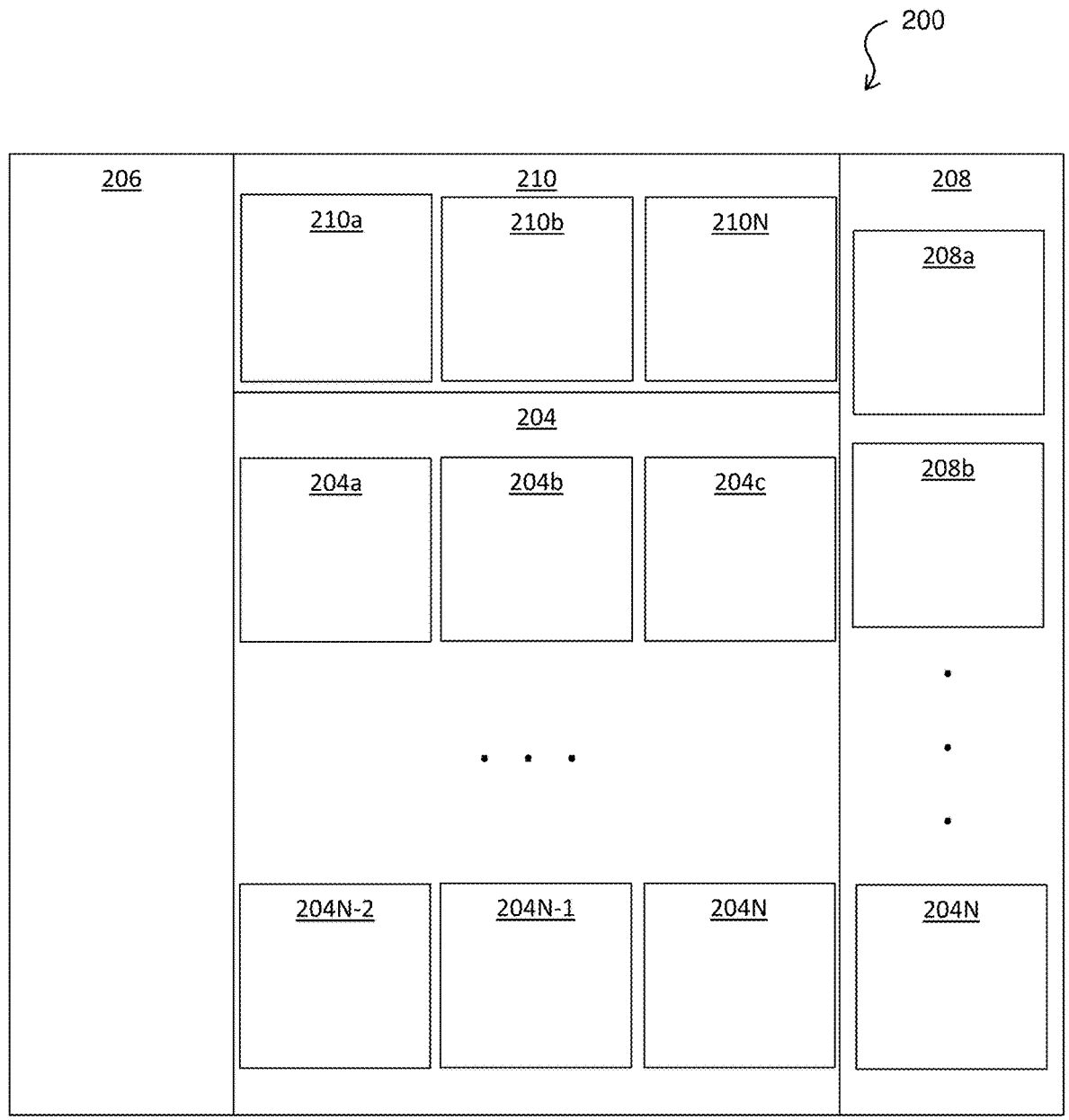
FIG. 2 depicts a block diagram of an exemplary command center dashboard according to one or more embodiments of the present invention.

FIG. 2 depicts a block diagram of an exemplary command center dashboard 200 according to one or more embodiments of the invention. The command center dashboard 200 includes a set of configurable windows 204, 206, 208, and 210 that each display a variety of information, graphics, and/or applications. Each window 204, 206, 208, and 210 can serve a specific purpose related to the KPIs that are selected. For example, the larger window 204 can be considered the focus window due to its size compared to the other windows 206, 208, 210. The focus window 204 can include a set of smaller windows 204a—N which can each display a different graphic, data, and/or application for the command center dashboard 200 and based on the KPI associated with the focus window 204. For example, an example KPI for the focus window in the global supply chain example could be facility status for the global supply chain. Each smaller window 204a—N can display an application associated with a set of facilities showing the status of each facility in the global supply chain. The applications can include, but are not limited to, real time data such as graphs, tables, and/or other graphics indicating characteristics of the real time data, live video feeds, historic video data, transcribed audio data, audio data, and the like. The left side window 206 can include a set of smaller windows similarly to the focus window 204. Also, the left side window 206 could include an application such as an interactive chat window allowing for multiple user input and communication regarding the command center dashboard 200. The chat window can be integrated with a commercial chat application. Further, the chat window can save the text data from the various chats from multiple users and the controller 102 (from FIG. 1) can analyze and process the text data using natural language processing (NLP) to automatically derive meaning from the text messages received in the interactive chat application in window 206. The other two windows 208 and 210 can be configured to include smaller windows 208a-208N and 210a-210N which similarly display information associated with the operation and/or organization as described above.

In one or more embodiments of the invention, the one or more computing devices 108a-108N can be utilized for setting up and adjusting the command center dashboard. The computer devices 108 can input operation data associated with the subject of the command center. In the supply chain example, the operation data can be data associated with the logistics company as well as information about the supply chain operation. Keeping with the global supply chain example, the controller 102 can obtain a dashboard template that has a set of customizable windows based on this operation data. Further information can be collected from a user and/or other sources to further customize a command center dashboard. A selection menu can be presented to the user which include a set of KPIs. As the user selects a KPI from the set of KPIs, the user can also select which window to present information related to the selected KPI. The controller 102, in some embodiments, can suggest a window for presentation of the information related to the selected KPI or automatically select a window for the information related to the KPI based on the operation data and/or historical data.

Figure 3:
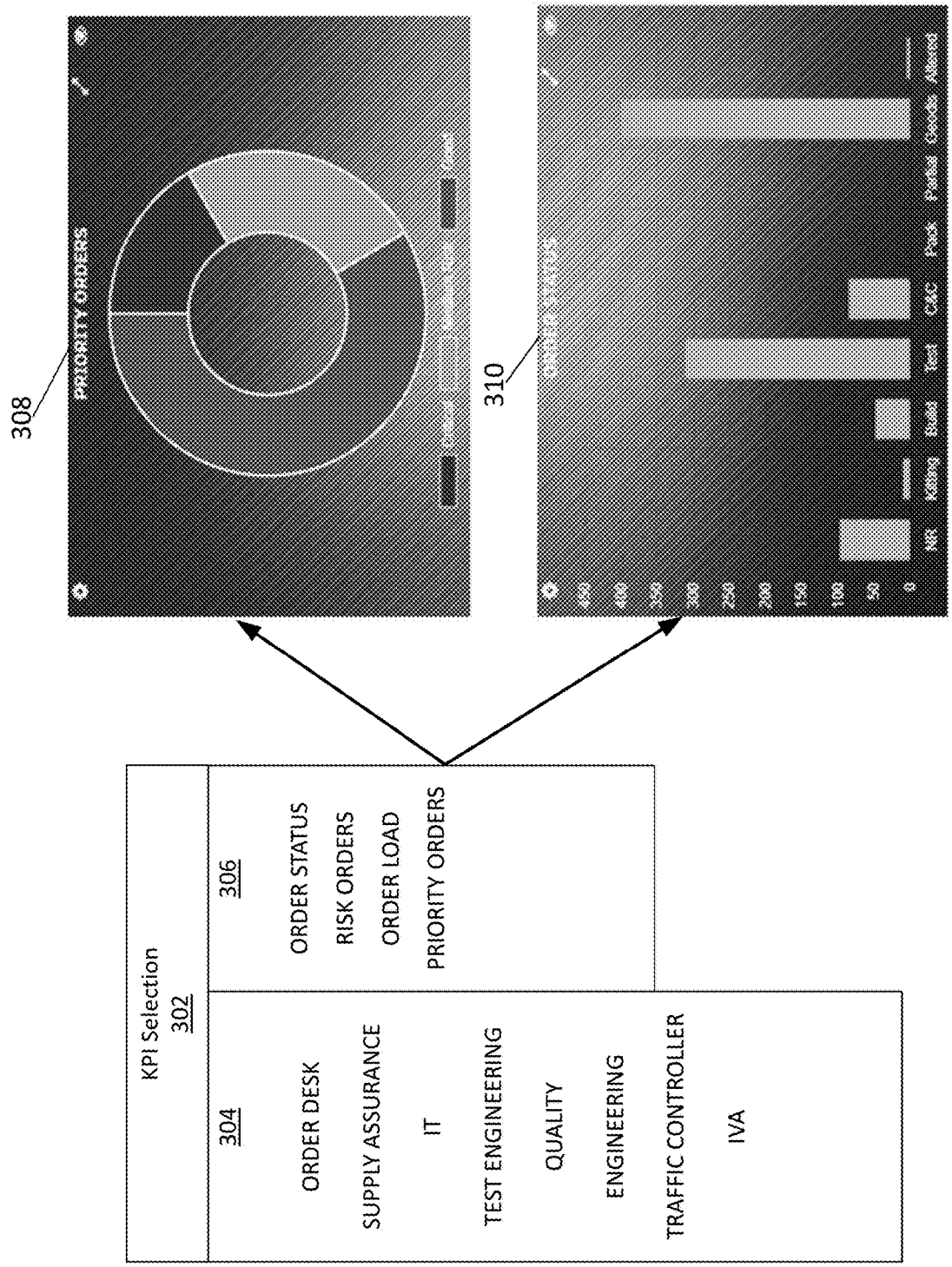
FIG. 3 depicts a selection menu for a set of KPIs and resulting window views according to one or more embodiments of the present invention.

FIG. 3 depicts a selection menu for a set of KPIs and resulting window views according to one or more embodiments. The KPI selection menu 302 includes a listing of KPIs for the exemplary supply chain command center dashboard. The menu 302 includes a set of categories 304 related to the KPIs for this application. Once selected, each category has associated contents 306. In the illustrated example, the first category of "Order Desk" is selected which corresponds to a set of contents shown in box 306. When selected, an associated window can be added to the dashboard showing the selected KPI content. In the illustrated example, the contents of category "Order Desk" are selected. These selected contents (i.e., Order Status and Priority Orders) will add windows the command center dashboard. These windows have associated applications 308, 310 which can be placed anywhere in the windows for the command center dashboard based on either the user selection or automatically placed by the controller 102. In this sense, the applications 308, 310 can refer to a graphic showing data in the form of tables and/or graphs. Also, applications 308, 310 can refer to real time video feeds, image data, audio data, textual data, and the like. An application 308, 310 can also be a computer module such as a chat window and/or video conference call window, for example.

In one or more embodiments of the invention, the controller 102 generates the command center dashboard utilizing a template dashboard and combining the operational data and selected KPIs. The command center dashboard can be continuously updated with new data as the data comes available from the computing devices 108a—N and/or the external database 140 or any other source of data. Further, in some embodiments of the invention, the command center dashboard includes a chat window in one of the set of windows (204, 206, 208, 210) which can received chat messages from various users of the computing devices 108a—N. The chat messages can be text data that can be analyzed by the controller 102 to update and/or augment the windows within the command center dashboard. In one or more embodiments, the controller 102 can automatically analyze the chat messages, using natural language processing (NLP), to automatically make changes or cause updates to the command center dashboard. NLP is a processing technique that is utilized to derive meaning from natural language. The controller 102 can analyze the content of the chat window by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized to derive meaning from the chat window text to adjust and/or augment characteristics of the command center dashboard. For example, the controller 102 can identify keywords within the chat window that may be related to a specific application within a window of the command center dashboard. If the command center dashboard includes video feeds showing a number of facility locations and a chat message includes a reference to a specific facility, the controller 102 can augment the window showing the specific facility based on the chat reference.

In one or more embodiments of the invention, the sensor 106 can collect audio and/or video data of users that are near the display device 104. The command center dashboard can be displayed, by the display device 104, as a projection on a wall. A number of users can be audibly discussing the command center dashboard and the sensor 106 can collect this audio data for NLP processing by the controller 102 to determine whether to update, adjust, or augment any of the command center dashboard windows. The audio data can be converted to text data using speech to text applications as well as speaker diarization techniques to identify the speaker. Once converted to text, the NLP processing can derive meaning from the user's conversations to adjust, update, and/or augment any of the windows on the command center dashboard. In some embodiments of the invention, the controller 102 may only analyze audio from specific users who may have administrative rights to adjust the command center dashboard, for example.

A leader or command center manager can use voice commands to adjust, update, and/or augment a window. An example command can be, "Enlarge the center window." Keywords such as "enlarge" and "center window" can be analyzed to determine the user wishes for a window in the center of the command dashboard to be enlarged. The actions available to be taken can be scored and compared to a threshold score to determine which action to take. For example, there may be more than one central window; however, a scoring may indicate that it is more likely that one window is the subject of the command versus another window. The controller 102 can utilize one or more learning algorithms and/or models to determine the action to be taken and store historical actions for later comparison. The controller 102 can confirm the command by presenting a pop-up window and/or audio notification that requests confirmation (e.g., "Did you mean the central video feed?"). These confirmations can be stored as historical data to better respond to future commands via the learning models.

In one or more embodiments of the invention, the audio data collected from the sensor 106 can also be utilized to change the content of the windows. For example, if a user wishes to change a window to display a different KPI, the user can audibly (in addition to manually inputting this to a computing device 108) request the controller 102 to update the command center dashboard by stating the KPI and the subject window update. A request such as, "Please update the central window to display sales histories." The controller 102, using NLP analysis, can extract keywords related to KPIs such as sales history. The location of the window to be updated can be determined to be a central window.

In one or more embodiments of the invention, the sensor 106 can also collect video data that can analyze video of the users of the command center dashboard. For example, the sensor 106 can detect certain movements and/or gestures by a user to determine how to adjust, update, and/or augment one or more windows in the command center dashboard. For example, a user may point to a specific window of the displayed command center dashboard. The sensor 106 can identify this gesture and also identify which window is being pointed at. The controller 102 may, for example, make the subject window larger or change its position to be more prominent within the command center dashboard. The detection of the certain movements and/or gestures can be determined utilizing image recognition and gesture detection techniques. The recognition analysis can utilize a threshold to determine whether to enact an action for the command center dashboard by scoring the movement and/or gesture and comparing the score with a pre-defined threshold. If the score exceeds this threshold, the controller 102 can automatically adjust, update, and/or augment a window in the dashboard. Additional actions for the window based on movement and/or gesture detection can include indicia highlighting a window, color changes of a boarder or background of a window, and the like.

In one or more embodiments of the invention, the computing devices 108a-108N can be any type of device including laptops, tablets, and smart phones connected via the network 130. Users can input operation data into the computing devices 108a-108N to update the windows on the command center dashboard. In addition, the computing devices 108a-108N can collect data in the form of audio or visual data to upload to the command center dashboard. For example, a smart phone camera can be used to collect real time video or pictures from a location that a user might be located. In a scenario where the command center dashboard is being utilized to deal with a natural disaster, the real time video data collected from portable computing devices can be displayed on the command center dashboard to assist with management of the situation.

Figure 4:
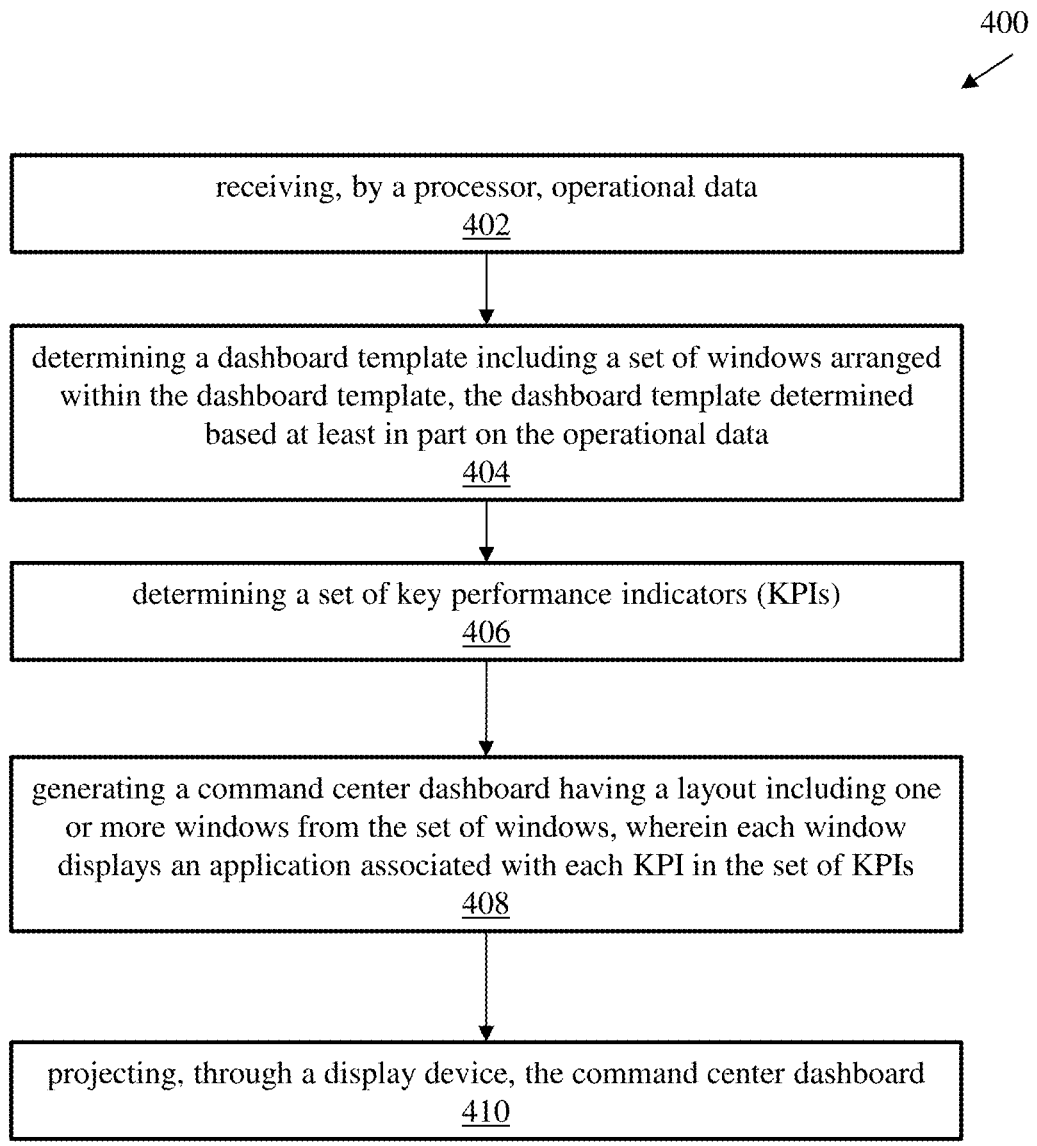
FIG. 4 depicts a flow diagram of a method for deploying a command center dashboard according to one or more embodiments of the present invention.

FIG. 4 depicts a flow diagram of a method 400 for deploying a command center dashboard according to one or more embodiments of the invention. At least a portion of the method 400 can be executed, for example, by the controller 102 shown in FIG. 1. The method 400 includes receiving, by a processor, operational data, as shown in block 402. Operation data refers to data associated with an organization, an organizational goal, and/or a goal of using the command center. For example, in an on-demand command center situation with respect to managing an event such as a natural disaster, the operational data can be data about the natural disaster, the location of the natural disaster, and/or any other information necessary for setting up a command center to manage said natural disaster. In another example, operational data can be data regarding a global supply chain that includes facilities data, orders data, transportation means data, and the like. This operational data sets up the status and goals of an operation being managed through the command center. The method 400, as shown at block 404, includes determining a dashboard template including a set of windows arranged within the dashboard template, the dashboard template determined based at least in part on the operational data. The dashboard template can be stored in a local database and utilized to populate command center dashboard. The method 400, at block 406, includes determining a set of key performance indicators (KPIs). Based on the KPIs, the method 400 includes generating a command center dashboard having a layout including one or more windows from the set of windows, where each window displays an application associated with each KPI in the set of KPIs, as shown in block 408. At block 410, the method 400 includes projecting, through a display device, the command center dashboard.

Additional processes may also be included. It should be understood that the processes depicted in FIG. 4 represent illustrations, and that other processes may be added or existing processes may be removed, modified, or rearranged without departing from the scope and spirit of the present disclosure.

Figure 6:
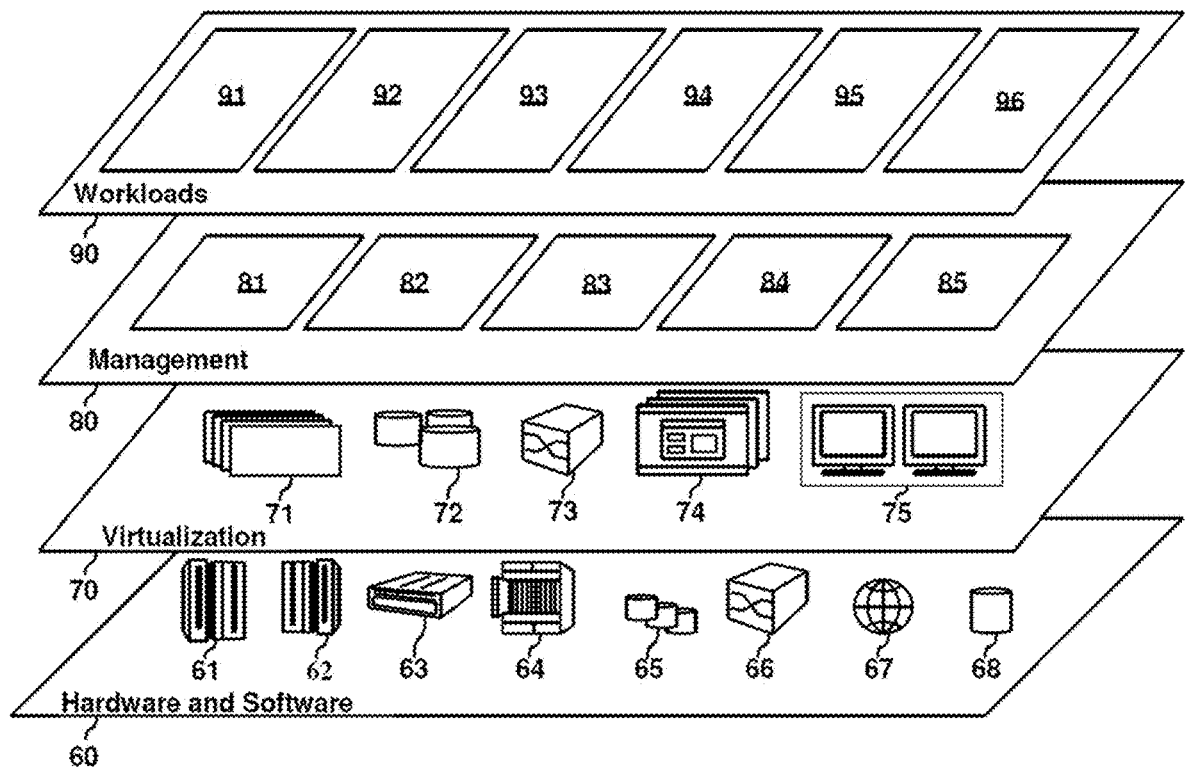
FIG. 6 depicts abstraction model layers according to one or more embodiments of the present invention.
Figure 7:
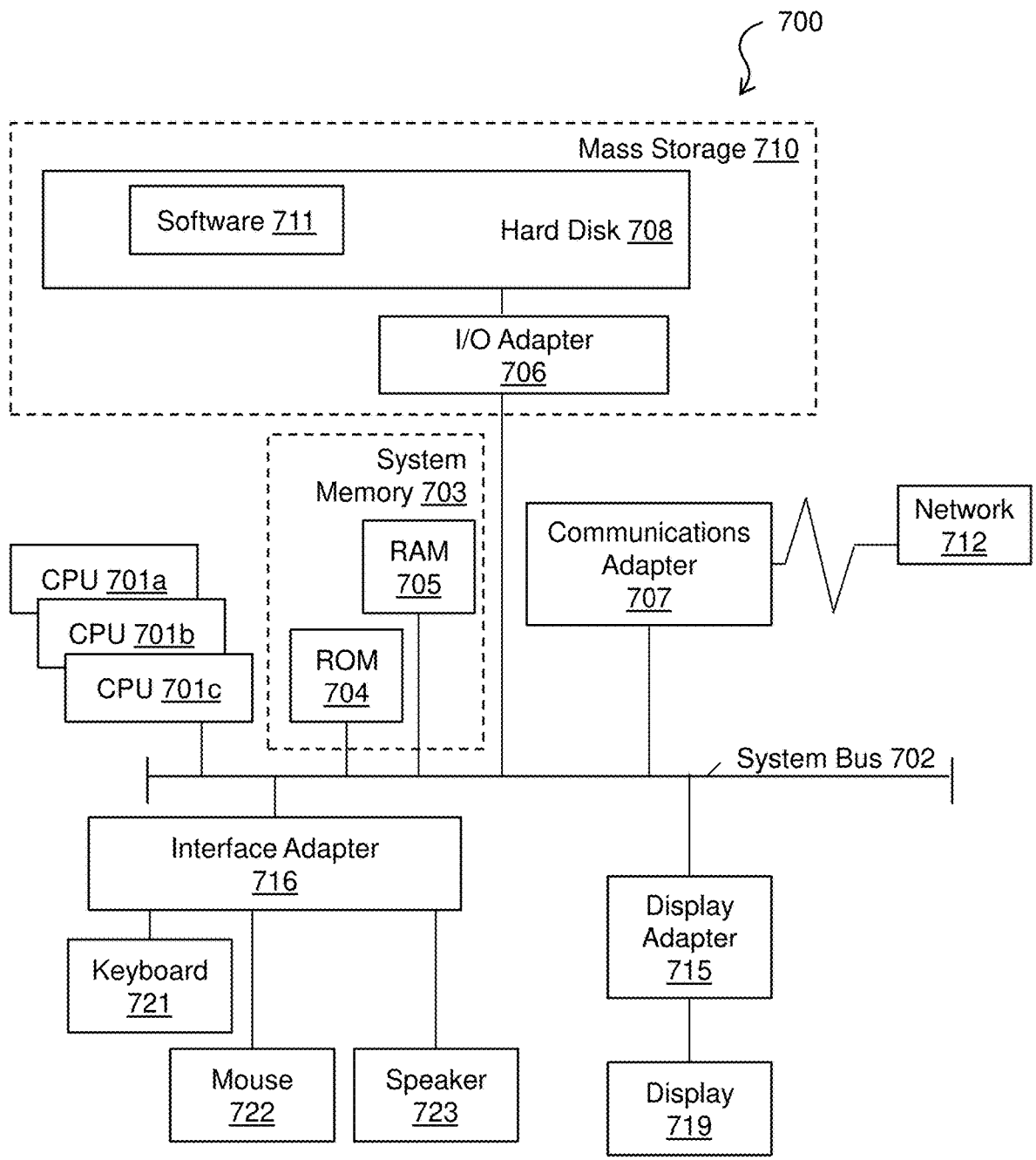
FIG. 7 depicts a computer system in accordance with one or more embodiments of the present invention.

In one or more embodiments of the invention, the controller 102 can be implemented on the processing system 700 found in FIG. 7. Additionally, the cloud computing system 50 can be in wired or wireless electronic communication with one or all of the elements of the system 100. Cloud 50 can supplement, support or replace some or all of the functionality of the elements of the system 100. Additionally, some or all of the functionality of the elements of system 100 can be implemented as a node 10 (shown in FIGS. 5 and 6) of cloud 50. Cloud computing node 10 is only one example of a suitable cloud computing node and is not intended to suggest any limitation as to the scope of use or functionality of embodiments of the invention described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
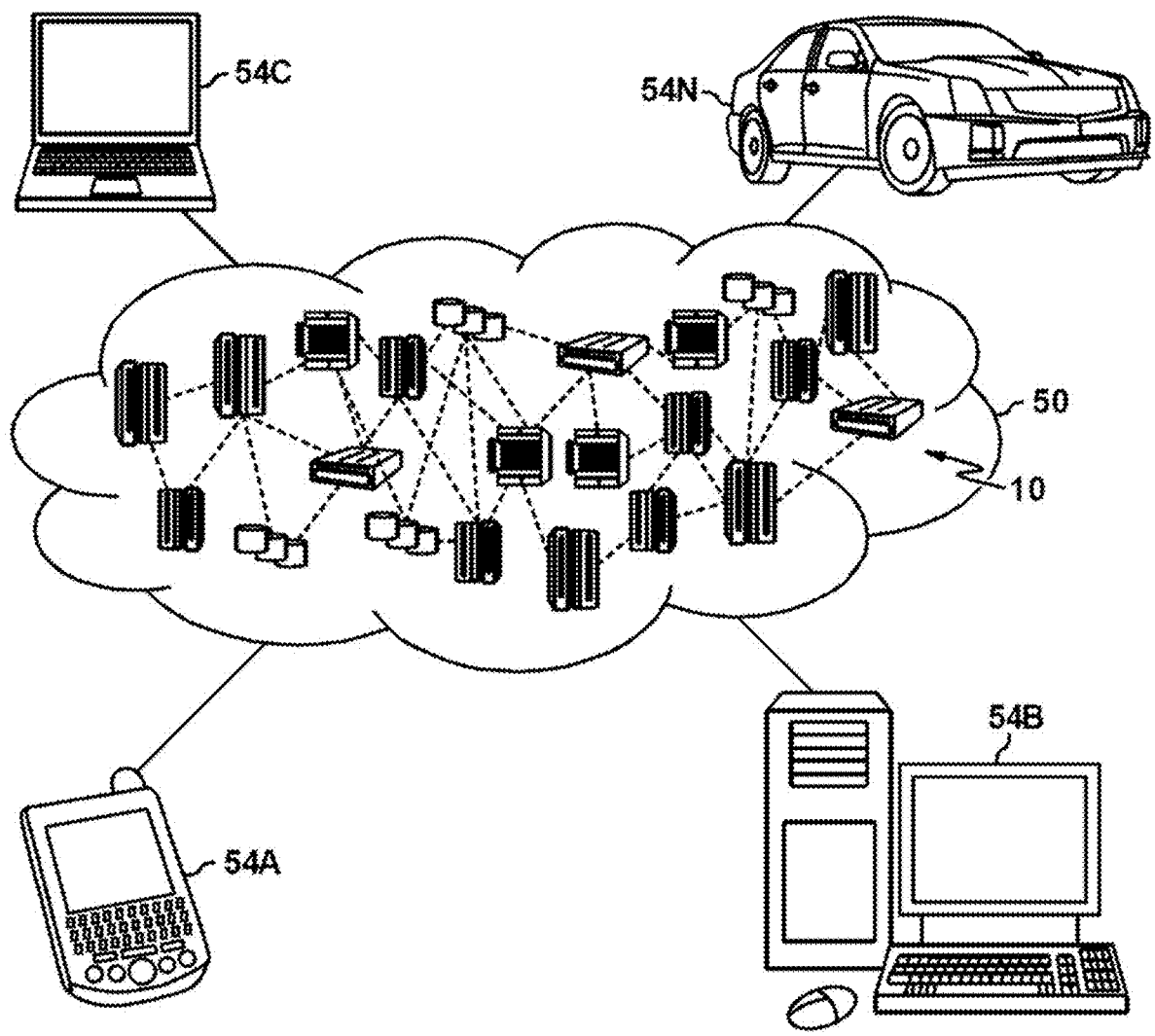
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a semi-virtualized, portable command center 96.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, operational data;
   determining a dashboard template including a set of windows arranged within the dashboard template, the dashboard template determined based at least in part on the operational data;
   determining a set of key performance indicators (KPIs);
   generating a command center dashboard having a layout including one or more windows from the set of windows, wherein each of the one or more windows displays an application associated with each KPI in the set of KPIs;
   projecting, through a display device, the command center dashboard; and
   responsive to at least one window of the one or more windows in the command center dashboard comprising an interactive chat window, analyzing, via a natural language processing (NLP) model executed by the processor, communications in the interactive chat window in order to adjust a characteristic of the command center dashboard;
   wherein responsive to application windows in the command center dashboard being fed video feeds of a plurality of facilities and responsive to the NLP model determining that one facility of the plurality of facilities in the application windows is included in a chat reference in the interactive chat window, a selected application window in the application windows is enlarged of a video feed for the one facility based on the chat reference in the interactive chat window.

2. The computer-implemented method of claim 1, further comprising:
   receiving, by a sensor in communication with the processor, audio data.

3. The computer-implemented method of claim 2, further comprising:
   analyzing, via the natural language processing (NLP) model executed by the processor, the audio data to extract one or more keywords from the audio data; and
   augmenting a first window in the one or more windows based at least in part on the one or more keywords.

4. The computer-implemented method of claim 3, wherein augmenting a first window in the one or more windows based at least in part on the one or more keywords comprises at least one of:
   enlarging the first window on the command center dashboard;
   changing a location of the first window in the command center dashboard; and
   generating an indicia highlighting the first window in the command center dashboard.

5. The computer-implemented method of claim 1, wherein determining the set of KPIs comprises:
   receiving, by the processor, user input data;
   determining one or more keywords from the user input data, wherein obtaining the one or more keywords comprises analyzing, using the NLP model, the user input data to extract the one or more keywords; and
   determining the set of KPIs from the one or more keywords.

6. The computer-implemented method of claim 1, wherein determining the set of KPIs comprises:
   receiving, by a sensor in communication with the processor, audio data;
   determining one or more keywords from the audio data, wherein obtaining the one or more keywords comprises analyzing, using the NLP model, the audio data to extract the one or more keywords; and
   determining the set of KPIs from the one or more keywords.

7. The computer implemented method of claim 1 further comprising:
   receiving, by a sensor in communication with the processor, video data.

8. The computer-implemented method of claim 7, further comprising:
   analyzing, via image recognition executed by the processor, the video data to identify one or more gestures by a user; and
   augmenting a first window in the one or more windows based at least in part on the one or more gestures by the user.

9. The computer-implemented method of claim 1, wherein at least one of the set of KPIs relates to a facility status of the one facility.

10. The computer-implemented method of claim 1, wherein at least one of the set of KPIs relates to a facility status of supply chains for the plurality of facilities.

11. A system comprising:
a memory having computer readable instructions; and
one or more processors for executing the computer readable instructions, the computer readable instructions controlling the one or more processors to perform operations comprising:
receiving operational data;
determining a dashboard template including a set of windows arranged within the dashboard template, the dashboard template determined based at least in part on the operational data;
determining a set of key performance indicators (KPIs);
generating a command center dashboard having a layout including one or more windows from the set of windows, wherein each window displays an application associated with each KPI in the set of KPIs;
projecting, through a display device, the command center dashboard; and
responsive to at least one window of the one or more windows in the command center dashboard comprising an interactive chat window, analyzing, via a natural language processing (NLP) model executed by the one or more processors, communications in the interactive chat window in order to adjust a characteristic of the command center dashboard;
wherein responsive application windows in to the command center dashboard being fed video feeds of a plurality of facilities in the application windows and responsive to the NLP model determining that one facility of the plurality of facilities is included in a chat reference in the interactive chat window, a selected application window in the application windows is enlarged of a video feed for the one facility based on the chat reference in the interactive chat window.

12. The system of claim 11, wherein the operations further comprise:
receiving, by a sensor in communication with the one or more processors, audio data.

13. The system of claim 12, wherein the operations further comprise:
analyzing, via the NLP model executed by the one or more processors, the audio data to extract one or more keywords from the audio data;
augmenting a first window in the one or more windows based at least in part on the one or more keywords.

14. The system of claim 13, wherein augmenting a first window in the one or more windows based at least in part on the one or more keywords comprises at least one of:
enlarging the first window on the command center dashboard;
changing a location of the first window in the command center dashboard; and
generating an indicia highlighting the first window in the command center dashboard.

15. The system of claim 11, wherein determining the set of KPIs comprises:
receiving, by the one or more processors, user input data;
determining one or more keywords from the user input data, wherein obtaining the one or more keywords comprises analyzing, using the NLP model, the user input data to extract the one or more keywords; and
determining the set of KPIs from the one or more keywords.

16. The system of claim 11, wherein determining the set of KPIs comprises:
receiving, by a sensor in communication with the one or more processors, audio data;
determining one or more keywords from the audio data, wherein obtaining the one or more keywords comprises analyzing, using the NLP model, the audio data to extract the one or more keywords; and
determining the set of KPIs from the one or more keywords.

17. A computer program product comprising a computer readable storage medium having program instructions embodied therewith, the program instructions executable by one or more processors to cause the one or more processors to perform operations comprising:
receiving, by a processor, operational data;
determining a dashboard template including a set of windows arranged within the dashboard template, the dashboard template determined based at least in part on the operational data;
determining a set of key performance indicators (KPIs);
generating a command center dashboard having a layout including one or more windows from the set of windows, wherein each window displays an application associated with each KPI in the set of KPIs;
projecting, through a display device, the command center dashboard; and
responsive to at least one window of the one or more windows in the command center dashboard comprising an interactive chat window, analyzing, via a natural language processing (NLP) model executed by the processor, communications in the interactive chat window in order to adjust a characteristic of the command center dashboard;
wherein responsive to application windows in the command center dashboard being fed video feeds of a plurality of facilities and responsive to the NLP model determining that one facility of the plurality of facilities in the application windows is included in a chat reference in the interactive chat window, a selected application window in the application windows is enlarged of a video feed for the one facility based on the chat reference in the interactive chat window.

18. The computer program product of claim 17, wherein the operations further comprise:
receiving, by a sensor in communication with the processor, audio data.

19. The computer program product of claim 18, wherein the operations further comprise:
analyzing, via the NLP model executed by the processor, the audio data to extract one or more keywords from the audio data;
augmenting a first window in the one or more windows based at least in part on the one or more keywords.

20. The computer program product of claim 19, wherein augmenting a first window in the one or more windows based at least in part on the one or more keywords comprises at least one of:
enlarging the first window on the command center dashboard;
changing a location of the first window in the command center dashboard; and generating an indicia highlighting the first window in the command center dashboard.

\* \* \* \* \*